United States Patent

[11] 3,624,800

| [72] | Inventor | Edwin Grant Swick<br>Bartlett, Ill. |
|---|---|---|
| [21] | Appl. No. | 861,967 |
| [22] | Filed | Sept. 29, 1969 |
| [45] | Patented | Nov. 30, 1971 |
| [73] | Assignee | Illinois Tool Works Inc.<br>Chicago, Ill. |

[54] FLUID FLOW CONTROL MEANS
4 Claims, 9 Drawing Figs.

[52] U.S. Cl........................................................ 251/4,
138/118, 138/177
[51] Int. Cl....................................................... F16k 7/02
[50] Field of Search........................................ 251/4–10;
138/118, 119, 177, DIG. 11

[56] References Cited
UNITED STATES PATENTS

| 1,683,322 | 9/1928 | Annis............................ | 251/8 |
|---|---|---|---|
| 2,701,565 | 2/1955 | Gewecke...................... | 128/214 |

FOREIGN PATENTS

| 142,472 | 7/1935 | Austria.......................... | 251/5 |
|---|---|---|---|
| 436,035 | 10/1926 | Germany....................... | 251/9 |
| 1,040,349 | 8/1966 | Great Britain................ | 251/5 |

*Primary Examiner*—M. Cary Nelson
*Assistant Examiner*—Richard Gerard
*Attorneys*—Robert W. Beart, Michael Kovac, Barry L. Clark and Jack R. Halvorsen ABSTRACT: A device for controlling the flow of fluids which includes tubing having an axial preflattened section, a clamp and means for orienting the tubing relative to the clamp.

PATENTED NOV 30 1971
3,624,800
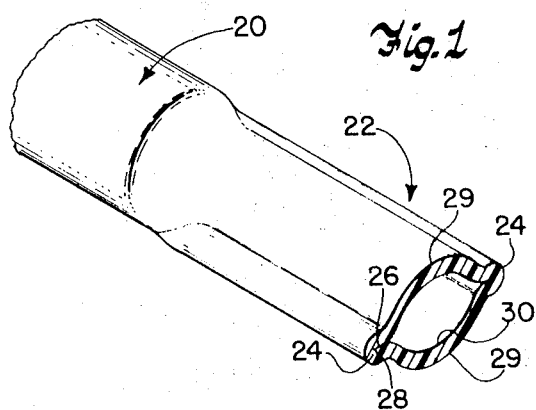
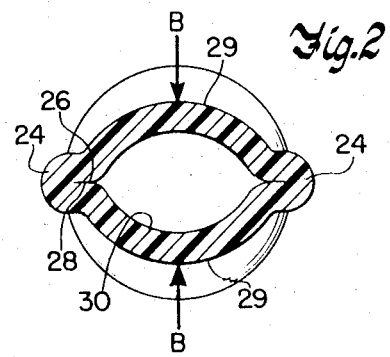
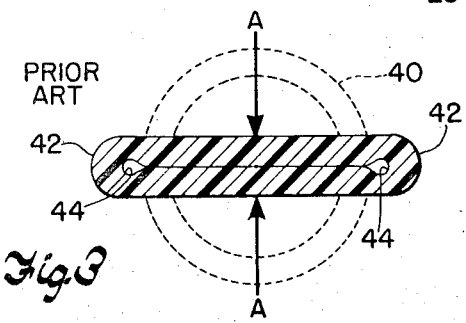
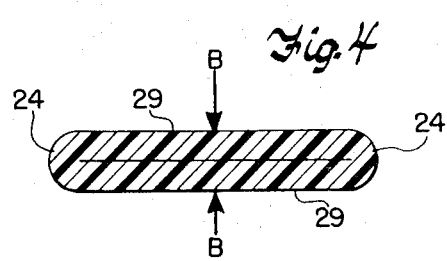
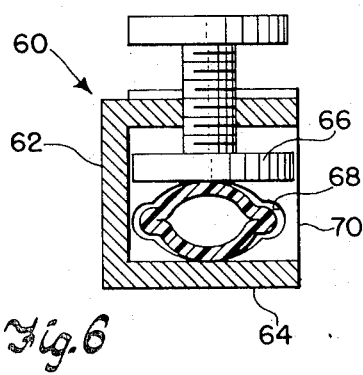
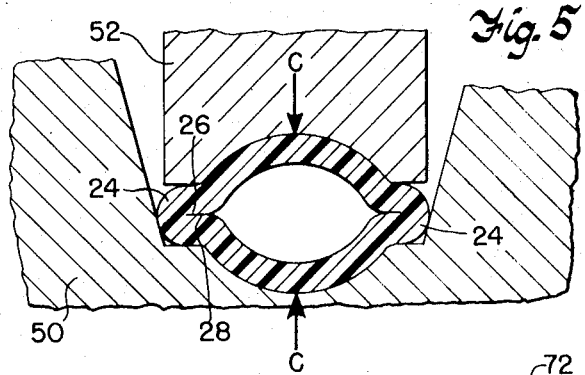
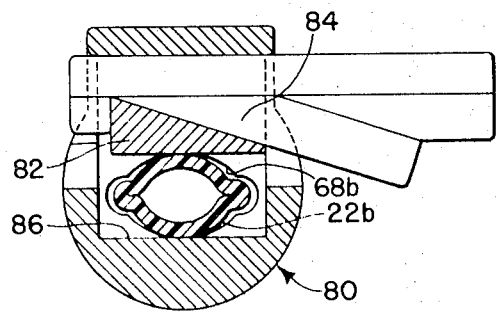
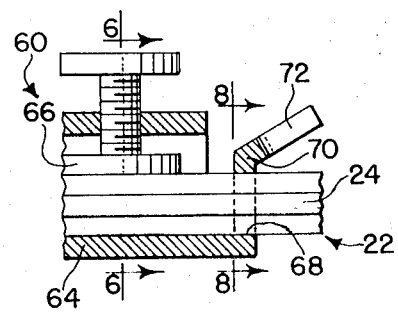
INVENTOR.
Edwin Grant Swick
BY
His Att'ys

FLUID FLOW CONTROL MEANS

BACKGROUND OF THE INVENTION

The transport of fluid from one point to another through tubing, be it rigid or flexible, normally requires a control means to regulate the rate and quantity of fluid passing through the tubing. In the case of rigid tubes and pipes, such devices normally take the form of valves while in the flexible tubing the valve-type elements normally are clamps. Such clamps can be categorized generally as screw clamps, lever clamps, cam or wedge clamps or crimp means, all of which categories of clamps tend to flatten or distort the tube so as to close the internal bore and thereby prevent the passage of fluid.

When small diameter plastic tubing is used for transporting a liquid such as in intravenous sets for the introduction of parenteral solutions through venipuncture or when the tubing is used in blood sets where the catheters are utilized in the withdrawal of blood for collection in a container, there exists a problem on how to accurately meter the liquid flow. When a round tube is compressed, whereby the wall of the bore is brought into engagement with the opposite wall of the bore i.e., into a virtually straight line relationship, the ends of the bore or corners have a tendency to remain open because of the amount of material that has to be displaced into a tight radius. The material in these areas is under high stress and there is a tendency in the use of plastic materials to relax or "cold flow." After a period of time there will be a variation in the internal configuration of this bore and because of this it is difficult to maintain an accurate initial setting with any clamp. In the case of the parenteral solutions it is necessary to maintain a constant drip rate so that the patient will obtain a predetermined quantity over a given period of time. In some instances if this rate is exceeded the patient can literally "drown" due to the presence of an excessive amount of solution in the blood. To accomplish this control it is a mandatory rule in most hospitals that a nurse must check the flow control means at least once every 5 minutes until the flow rate is stable and substantially constant. Many times, in the 5-minute interval, the flow of liquid can vary as much as 50 percent from the initial setting. Thus, to ensure an accurate flow requires a constant periodic check by the attending personnel until it is stabilized to ensure that the patient is getting the exact quantity and rate of solution prescribed by the physician. Unfortunately, if a variation in flow rate is required, an additional amount of time must again be allotted for "cold flow" in order to obtain a constant flow rate.

SUMMARY

This invention relates to the preforming and permanent crimping of an axial portion of an initially circular tubing whereby the opposed axially extending portions of the internal bore wall have adjacent surfaces sealed against one another to form a bore defining in cross section a flattened oval with opposed pointed ends falling substantially on the major dimension of the oval and opposed elongated smooth curved surfaces falling on the minor dimension of the oval. Such a tube is oriented within a clamp means wherein the clamp will apply a transverse force along the minor axis of the oval to incrementally collapse a portion of the tube to reduce the available passageway through the tubing from a maximum until the tubing bore is completely closed. The first flow setting established with this tube and clamp combination will maintain a substantially constant rate of flow through the tubing since the axial precrimping of the tubing eliminates the area in which there is a tendency to relax or "cold flow." Thus, with this type of tube the initial setting will remain constant and no further resetting is required.

DRAWINGS

FIG. 1 is a perspective view of the preferred embodiment of this invention;

FIG. 2 is an end view of the device shown in FIG. 1;

FIG. 3 is a cross-sectional elevation of a piece of tubing of the prior art in compressed form;

FIG. 4 is a piece of tubing in cross section of the preferred embodiment in compressed form;

FIG. 5 is a cross-sectional view of an ultrasonic horn and anvil used to form the preferred embodiment;

FIG. 6 is an elevational view in partial section of one form of clamp usable with the present invention;

FIG. 7 is a side elevational view of the device shown in FIG. 6;

FIG. 8 is an elevational view in partial section taken along lines 8—8 of FIG. 7; and FIG. 9 is an elevational view in partial section of a wedge-type clamp capable of being used with the present invention.

DESCRIPTION

Referring now to the drawings wherein similar parts are designated by similar numerals throughout the drawings;

FIG. 1 is a perspective view in partial section of a tube 20 having an axially extending preflattened portion 22. The tube 20 is preferably an extruded plastic tube, such as F.D.A. approved plasticized vinyl, polytetrafluoroethylene, or polyethylene, initially having a circular cross-sectional form and then partially flattened by crimping. The portion 22 includes opposite laterally and axially extending riblike side portions 24 in which the internal opposed surfaces 26, 28 of the wall of the bore 30 have been distorted and brought into juxtaposed relation and then preferably are sealed together. This results in the crimped portion of the tubing being flattened from a circular or cylindrical configuration to an elongated oval with the bore having a cross section at the opposed sealed edges which tapers down to a knife-edgelike sharp line which along with the lateral rib portions 24 falls on the major axis of the oval while the curved opposed surfaces 29 generally fall on the minor axis of the oval.

As best seen in FIG. 3, when a prior art cylindrical tubing 40, shown in phantom, is subjected to a transverse force, diagrammatically represented by the arrows A—A, the tubing can be collapsed to a position whereby the opposed surfaces of the internal wall of the bore abut one another in a flat line. However, due to the nature of the tubing there is a tendency for the extremity of the contacting wall, due to the short radius of curvature in the opposed edges generally designated 42, to leave an unclosed portion of the tubing in the form of teardrops in cross section as designated by the numeral 44.

As has been indicated above it has been found that the tubing will "cold flow" or relax and the size and configuration of the openings 44 under compressive load will vary. They will either prevent total closure of the tubing or will close up and eliminate passage of liquids which were intended to be passed. In the instant invention when a transverse force, indicated schematically by the arrows B—B in FIG. 2, is applied to the tubing of the instant invention, the tubing will, upon application of sufficient force in the direction of arrows B—B, assume a configuration substantially as shown in FIG. 4 when sufficient pressure is applied to completely collapse the tubing. The crimping of portions 24 results in an elimination of the openings 44 and the "cold flow" problem. If the tubing, shown in cross section in FIG. 2, is collapsed to an intermediate position between that shown in FIG. 2 and the totally closed position shown in FIG. 4 the tubing will tend to retain the intermediate position under a partial clamping load and to maintain that position without "cold flow." Release of the clamping pressure results in a return to the initial configuration of FIG. 2.

Tubing of this type can be crimped and sealed quite readily due to its thermoplastic nature. One proposed form of production shown in FIG. 5, is to utilize an anvil 50 and horn 52 in an ultrasonic sealing machine in which the anvil and horn are recessed and configured to accept a round tube. Application of pressure in the direction of arrows C—C to a round tube as well as an ultrasonic impulse through the horn 52 results in the deformation of the tubing as well as the welding or sealing of the opposed surfaces 26, 28 in the rib position 24, if desired. Similarly, an application of radio frequency sealing means or heat and pressure along the limited area 24 of a circular tube will result in a configuration of the desired variety.

The use of a preflattened or crimped tubing will improve the operation of all of the heretofore known clamps used, particularly, in the medical field. For example, in FIG. 6 there is shown in partial section a schematic screw clamp 60 having a frame 62 with a base 64 and screw adjustable pressure means 66. The tubing preferably is maintained in an oriented position by means such as an aperture 68 in an upstanding wall 70 complementary in shape to the flattened or crimped portion of the tubing. This will ensure the application of the transverse force along the minor axis as defined by the arrows B—B. Such a clamp can additionally be provided with a total cutoff means, in the present instance, a semirigid slot means 72 into which the tube is inserted after twisting about its longitudinal axis with the edges of the slot 72 acting along the minor axis of the crimped portion to totally compress the tube to the closed configuration shown in FIG. 4.

As further example of the variety of clamps usable with this type of tubing, FIG. 9 discloses a wedge-type clamp 80 in which the oriented tube 22b is acted upon by the movable block 82 controlled by the cam or wedge 84 which moves the block 82 and its complementary inclined surface toward the base 86 of the clamp means.

It will be appreciated that many other styles of clamps are available for use in combination with the type of tubing set forth above. The objective of the invention is the establishment of a means capable of maintaining a constant rate of fluid flow with a minimum of adjustment. The described embodiments of an axially crimped tubing, means for orienting the tubing and suitable clamp means for applying a transverse force to the tube have generally resolved the problems which previously have prevented other from reaching the objective.

I claim:

1. An extruded flexible plastic tubing generally circular in cross section for conveying fluids including a limited axial portion having a generally curved noncircular internal bore, said tubing being initially circular and said limited axial portion being crimped along opposite sides thereof and permanently deformed so that opposed axially extending portions of said bore wall have adjacent surfaces thereof brought into juxtaposition to one another to form a bore defining in cross section a flattened oval having opposed sharply pointed feathered ends falling substantially on the major axis of the oval and opposed smooth curved surfaces falling on the minor axis of the oval, the outer surfaces of said limited axial portion being generally curvilinear in relaxed condition, said tubing when subjected to sufficient force along said minor axis collapsing to totally close said bore and feathered ends of said oval bore eliminating cold flow in said limited axial portion.

2. Tubing of the type claimed in claim 1 wherein said juxtaposed portions are sealed to one another substantially throughout their length.

3. A device for controlling the flow of fluids including a small, round, flexible plastic tubing for conveying the fluids having a limited axial portion provided with a generally curved noncircular internal bore, said tubing being initially circular and said limited axial portion being crimped along opposite sides thereof opposed axially extending portions of said bore wall having adjacent surfaces thereof brought into permanent juxtaposition to one another to form a limited axial bore defining in cross section a flattened oval having opposed sharply pointed feathered ends falling substantially on the major dimension of the oval and opposed smooth curved surfaces falling on the minor dimension of the oval, clamp means for clamping the flexible tubing and at least one orienting means spaced from said clamp means having a complementary configuration for surrounding and capturing a segment of said limited axial portion of the tubing in a predetermined relationship with the minor axis of the tubing bore being positively oriented relative to said clamp means whereby said clamp means can apply a transverse force to incrementally collapse the bore and reduce the available passageway through said tubing from a maximum until the tubing bore is completely closed, said crimped limited axial portion of said tubing obviating the normal cold flow inherent in the round portion of said plastic tubing.

4. A device of the type claimed in claim 3 wherein said juxtaposed portions are sealed to one another throughout their length.

* * * * *